Inventor
Gilbert F. Hill
by Joseph V. Claeys
His Attorney

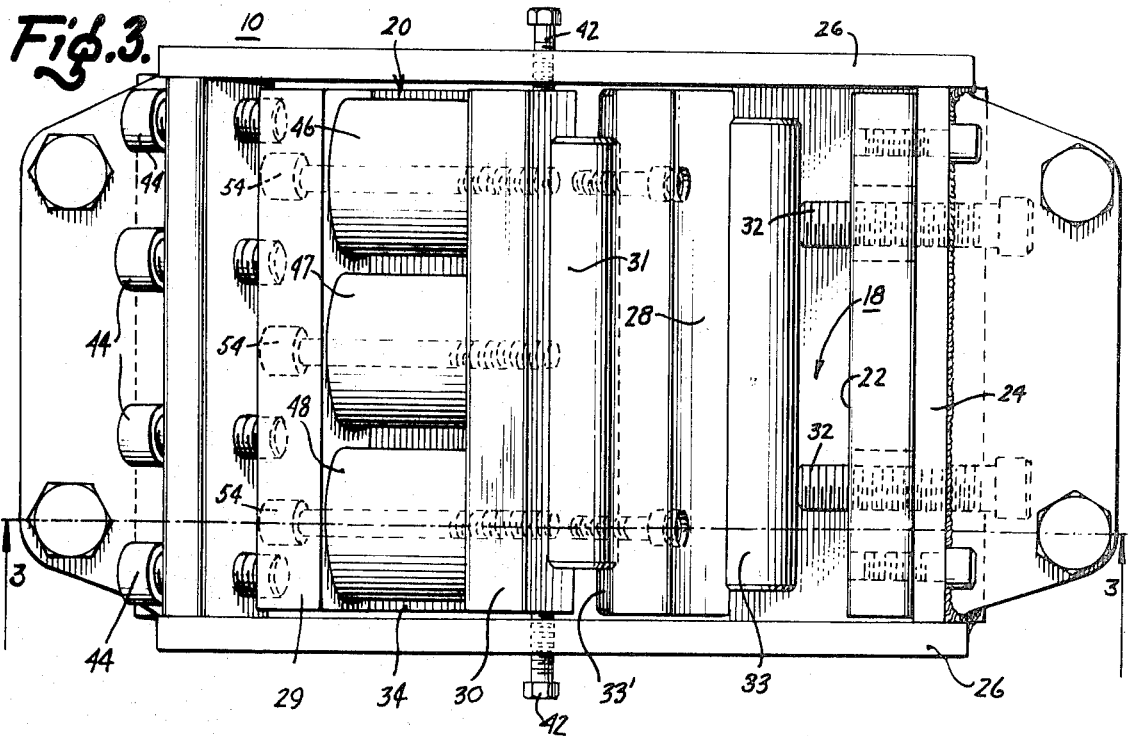
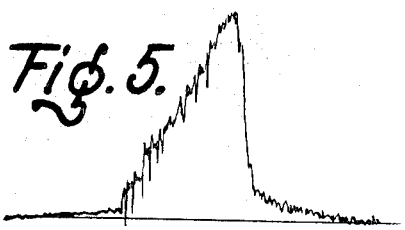
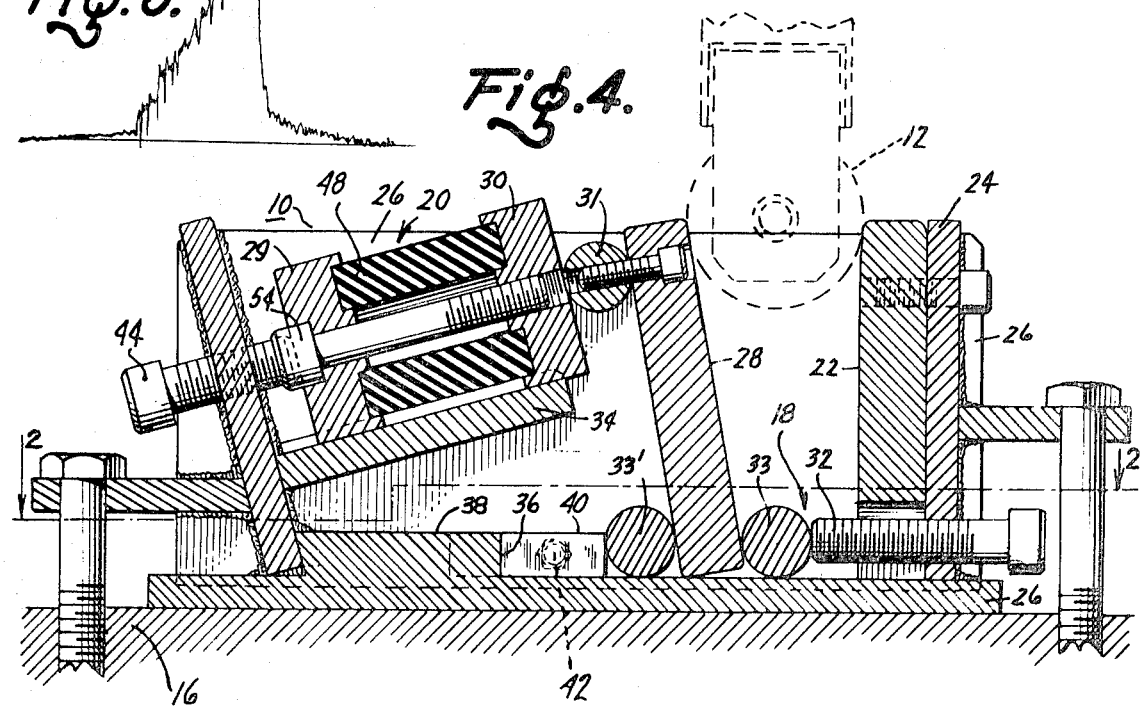

Nov. 9, 1971 G. F. HILL 3,618,362
PROGRAMMING MEANS FOR SHOCK TESTING MACHINES
Filed Jan. 2, 1970 3 Sheets-Sheet 3

Inventor
Gilbert F. Hill
by Joseph V. Claeys
His Attorney

United States Patent Office 3,618,362
Patented Nov. 9, 1971

3,618,362
PROGRAMMING MEANS FOR SHOCK TESTING
MACHINES
Gilbert F. Hill, Skaneateles, N.Y., assignor to Mechanical
Technology Incorporated, Latham, N.Y.
Filed Jan. 2, 1970, Ser. No. 17
Int. Cl. G01n 3/08
U.S. Cl. 73—12 16 Claims

ABSTRACT OF THE DISCLOSURE

A shock programmer for use with shock testing apparatus wherein a striker member which may be on the underside of a movable specimen-supporting carriage, is adapted to be decelerated in a desired manner by engagement with a force resisting channel which channel has an elastomeric spring means, or other suitable energy absorbing means, arranged so that the energy of the impacting striker member is imparted simultaneously to the channel and the elastomeric spring means. The reaction force can be adjusted, as required to obtain a desired shock pulse, by adjustment of the shape of the tapered impact channel and selection and/or adjustment of the characteristics exhibited by the energy absorbing-storing means.

This invention relates to shock testing machines and more particularly to a new and improved programming means for obtaining shock pulses.

The programming means of this invention is capable of being used with any of a wide variety of shock testing machines known in the prior art. For example, one type of shock testing apparatus, widely used, comprises a movable carriage for carrying a test specimen and which carriage is arranged for guided movement toward a reaction mass, either under the force of gravity or by a suitable powered driving means. The machines also include a shock programmer disposed between impacting masses (e.g. between the carriage and the reaction mass) to program the particular shock pulse required for the specific test. As is well known, there are a number of different shock pulse shapes required in the field of shock testing. Since the present invention is so especially suited for obtaining well defined sawtooth shock pulses. It will be described in detail herein in that connection. It is to be appreciated, however, that the invention is not limited to devices for optaining sawtooth shock pulses since the basic concepts may be extended to provide devices for obtaining other pulse shapes. The term "shock pulse" is used herein in its customary sense in connection with shock testing, and is defined as the plot of acceleration of the carriage versus time as the carriage impacts the programmer.

By way of illustration and explanation only, and not by way of limitation, reference may be made from time to time to the use of the invention with a shock testing machine of the free-fall type. That is, a shock testing machine where the desired shock is produced by impacting a free-falling carriage carrying the test specimen against a reaction mass, for example the base structure of the machine. It is to be understood however, that the carriage may be power-driven and programmers in accordance with this invention will respond in the same manner to provide for the desired shock pulses.

In order to approximate the desired shock duration, magnitude and pulse shape, the prior art apparatus has employed various different types of programming means interposed between the carriage and the reaction mass. Several methods have been used in the past to obtain various shock pulses; however as is well known, obtaining sawtooth shock pulses has always been difficult. One relatively simple plastic-type decelerator comprises impacting the carriage against suitably shaped lead pellets. Hydraulic programmers have also been employed as have combinations of a hydraulic programmer and elastic decelerators such as metals, liquid or rubber springs. Further, combinations of hydraulic and pneumatic systems have also been employed.

While each of the foregoing programming methods have been used with some success, none have been entirely satisfactory for the purpose, especially from the standpoint of cost, simplicity and repeatability, so that there has been a continuing need to provide a more completely satisfactory arrangement, especially in connection with the production of sawtooth shock pulses. For example, the shaping and casting of non-reusable lead pellets is both costly and time consuming. Likewise, the hydraulic and pneumatic systems are complicated and difficult to manufacture and calibrate. Moreover, at least in connection with pneumatic systems, an external power source is required.

It is an object of this invention, therefore, to provide a new and improved programmer for obtaining shock pulses which overcomes one or more of the disadvantages of the prior art arrangements.

It is another object of this invention to provide a simple and inexpensive programming means for obtaining shock pulses and one which is free of any external power systems and is readily and easily adjustable to provide for a wide range of shock levels and times.

It is still another object of this invention to provide a new and improved programmer means wherein the desired shock pulse can be repeatedly and accurately reproduced.

It is a further object of this invention to provide a new and improved shock programmer means which can be readily made to prevent rebound of the carriage after impact.

A still further object of this invention is to provide a new and improved shock programmer which can be readily adjusted to provide for a wide range of shock levels and times.

Briefly stated, in accordance with one aspect of this invention, the shock programmer comprises the operative combination of a force resisting channel means arranged in combination with an energy absorbing-storing means with such combination disposed between the impacting masses of a shock testing machine. The force resisting channel means and the energy absorbing-storing means are arranged so that the energy of the impacting mass is distributed simultaneously to both the channel means and the energy absorbing-storing means. Thus, the channel and the energy absorbing-storing means cooperate to provide a non-linear force displacement characteristic as required to obtain a desired shock pulse. For example, sawtooth shock pulses of different desired time durations may be readily obtained by providing a tapered channel and with suitable adjustment of the shape of the tapered channel and/or adjustment or selection of the characteristics exhibited by the energy absorbing-storing means.

There has long been a desire for a programming means for shock testing machines which would combine ease and range of adjustment and accurate repeatability with simplicity and low cost. Moreover, such programmer should not require any external power sources and should be free of rebound problems so as to avoid undesired second impacts.

The programming means of this invention achieves all of the foregoing desiderata by the novel combination of a force resisting channel and an energy absorbing-storing means in operative impact responsive relationship therewith. Simply stated, in accordance with one embodiment of the invention, there is provided a tapered force resisting channel and an energy absorbing-storing means arranged to be disposed between the impacting masses of a shock testing machine and wherein the channel and energy absorbing-storing means are in an operative relationship so that the energy of the impacting mass is imparted simultaneously to both the tapered channel means and the energy absorbing-storing means. The foregoing arrangement is not to be confused with those prior art arrangements which employ two different programming devices in a series relationship wherein one device is employed to control the pulse rise time and the other device, which may be a gas-controlled piston, is employed to clip at the peak.

In the arrangement of this invention energy is absorbed by a cooperative, simultaneous action of friction between the channel walls and the striking member which engages such walls, and the storage of energy by a suitable energy absorbing-storing means.

The novel features believed characteristic of the invention are set forth with particularity in the appended claims. The invention itself, however, both as to its organization and method of operation together with further objects and advantages thereof may best be understood from the following description taken in conjunction with the accompanying drawing wherein like reference numerals in the different figures designate the same or similar parts, and in which:

FIG. 3 is a plan view of the programmer of FIG. 1;

FIG. 4 is a cross-sectional view taken along the line 4—4 of FIG. 3; and

FIG. 5 illustrates a typical unfiltered sawtooth pulse obtainable from the programmer in accordance with one embodiment of this invention.

Figure 1:
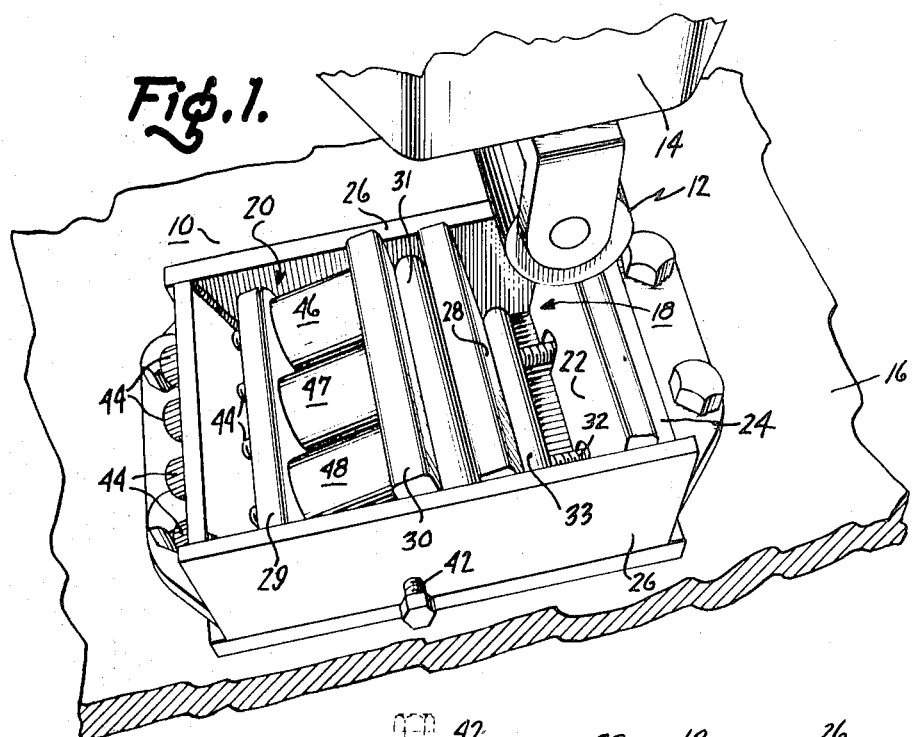
FIG. 1 is a perspective view of a programming means in accordance with an embodiment of the invention for use with shock testing apparatus to obtain sawtooth shock pulses.
Figure 2:
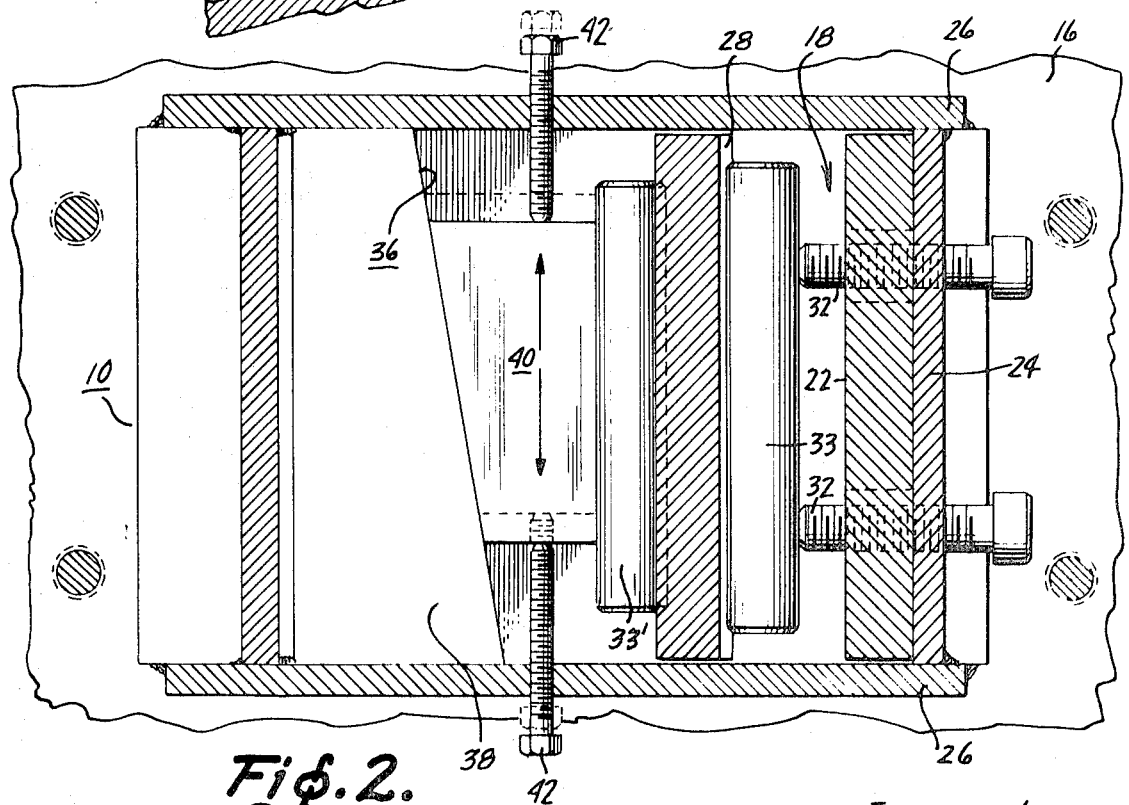
FIG. 2 is a cross-sectional view of the programmer taken along the line 2—2 of FIG. 4.

Referring now particularly to FIGS. 1 through 4 of the drawing, there is shown a shock programmer 10 in accordance with an embodiment of this invention interposed between a striker member 12, shown mounted on the underside of carriage 14, and a suitable reaction mass 16 of a shock testing machine. Since the shock testing machine per se forms no part of the present invention, the carriage 14 and reaction mass 16 are only partly illustrated. Striker member 12 is shown as a cylindrical member rotatably mounted within a pair of side members. While this arrangement has the advantage that wear due to operation can be distributed around the cylindrical surface, the striking member 12 may be provided by any other suitable member such as, for example, a simple blade means which may, if desired, be provided with chamfered edges. Also, it is to be understood that the striker member may be associated with the programmer assembly 10 rather than with the carriage 14 as illustrated.

Shock programmer 10 is arranged and adapted to exhibit a non-linear force-displacement characteristic when impacted by carriage 14 to provide the desired sawtooth shock pulse. To this end, shock programmer 10 comprises a tapered force resisting channel means 18 and an energy absorbing-storing means 20 in operative impact responsive relationship therewith. Channel means 18 has a generally trapezoidal cross section defined by a vertical wall means 22 rigidly secured to an end wall 24 of a suitable frame means 26 and an adjustable inclined wall means 28 disposed in frame means 26.

Energy absorbing-storing means 20 is disposed in operative relationship between a pair of plates 29 and 30. A force transmitting member 31 is disposed between plate 30 and inclined wall means 28.

In the arrangement illustrated in the drawing, vertical wall means 22 is rigidly mounted in frame 26 while inclined wall means 28 is supported at the lower end between stop bolts 32 and a suitable fulcrum means 33, which is illustrated as a simple rod means. The upper end of inclined wall means 28 is supported by the energy absorbing-storing means 20 which is movably supported on a suitable guide means 34. The inclined wall means 28 is shown as being adjustable at the lower end thereof by means of a tapered cross slide mechanism 36 which provides for changing the longitudinal position of fulcrum 33 in frame 26. Cross slide mechanism 36 is shown in more detail in FIG. 2 and comprises a stationary angle plate 38 secured to the frame 26 and a mating angle plate 40 movable transversely along the angled surface of plate 38 in accordance with the adjustment of screws 42.

The position of the top of inclined wall means 28 may be changed by movement of the energy absorbing-storing assembly 20. Such movement may be effected in any suitable manner, such as by means of adjusting screws 44. As illustrated, screws 44 provide a convenient means for adjusting inclined wall means 28 to change the shape of the tapered channel.

There has been described, therefore, a novel arrangement wherein relative motion between the striker member 12 and the fulcrum means 33 causes the inclined wall means to function as a lever of variable advantage to effect a desired non-linear relationship. Also, the angles of the tapered channel are self-locking thereby preventing free return of energy stored in the elastic means. Further, adjustment of the shape and size of the channel provides for changing the starting point of impact of the striker member in such channel in a very simple and easy manner.

In the particular arrangement selected for illustration of the invention, energy absorbing-storing means 20 is shown as comprising a plurality of elastomeric members 46, 47 and 48. The elastomeric members are disposed between end plates 29 and 30 which are connected by an adjusting bolt 54 so that the elastomeric members may be made to exhibit a desired characteristic. For example, bolts 54 may be adjusted to provide for a certain precompression of the elastomeric members so that the combined reactions of the tapered impact channel means and the energy absorbing-storing means will result in a desired sawtooth shock pulse. Although energy absorbing-storing means 20 has been illustrated as comprising an elastomeric means, it will be understood that other suitable means may be used to provide this function, such as for example, metal or liquid spring means, or the like. Also, while a plurality of separate members have been illustrated, it is apparent that the energy-absorbing-storing function can be provided by a single such member.

From the foregoing description it can be seen that tapered force resisting channel means 18 and energy absorbing-storing means 20 are arranged so that energy is absorbed by cooperative, simultaneous action of friction between slidable members and storage of energy by the elastic means. That is, the wedging action of the tapered channel together with the energy absorbing-storing characteristics combine to provide an overall non-linear force-displacement characteristic by programmer 10 to thereby produce a sawtooth shock pulse as desired. For example, the carriage 14 of the shock testing machine with which the programmer is employed, is decelerated as the striker member 12 enters the tapered channel means 18, As a result of the taper and friction between hcannel means 18 and the striker member 12, a wedging action occurs which not only decelerates the carriage 14 but, in combination with the energy-storing action of energy absorbing-storing means 20, results in a self-locking action which prevents the carriage from rebounding and causing a second undesired impact. This self-locking action is due to the unique combination of the tapered impact channel and the energy absorbing-storing means in operative association therewith, so that no separate brake or locking means is required as in prior art arrangements.

Since the shape of tapered channel means 18 as well as the characteristics of energy absorbing-shoring means 20 may be readily adjusted, sawtooth shock pulses of a wide variety of different pulse levels and durations may be easily obtained. Also, the programmer means of this invention is immediately reusable without any need for re-adjustment or replacement of elastic or plastic impact means. In addition to providing for adjustment of the characteristics of the energy absorbing-storing means, there may also be a selection of different types of energy absorbing-storing means or of elastomeric members, or the like so as to provide for various different ranges of characteristics, if desired. That is, the characteristics of the energy absorbing-storing means 20 may be both selected and adjusted conveniently, different energy absorbing-storing assemblies may be provided to produce a different characteristic. A typical unfiltered sawtooth shock pulse obtainable from one embodiment of the programmer of this invention is shown in FIG. 5.

Figure 6:
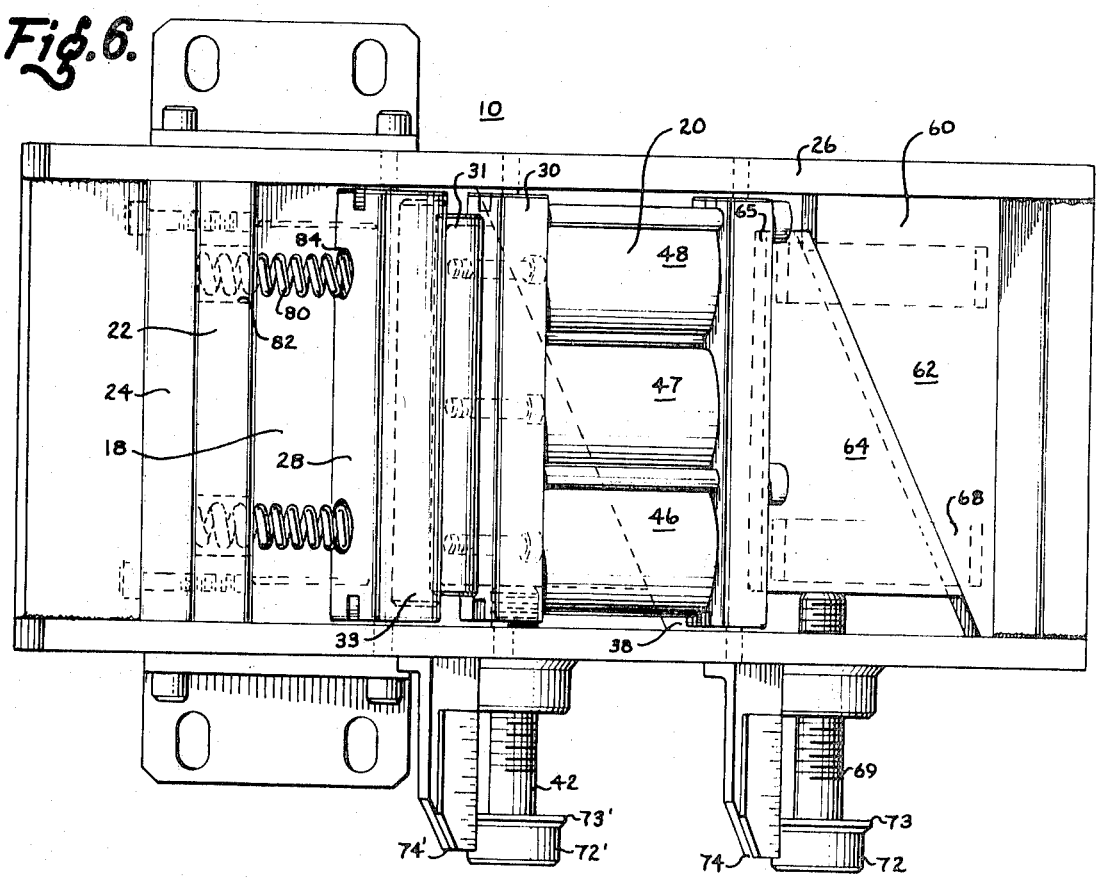
FIG. 6 is a plan view in accordance with another embodiment of the invention.
Figure 7:
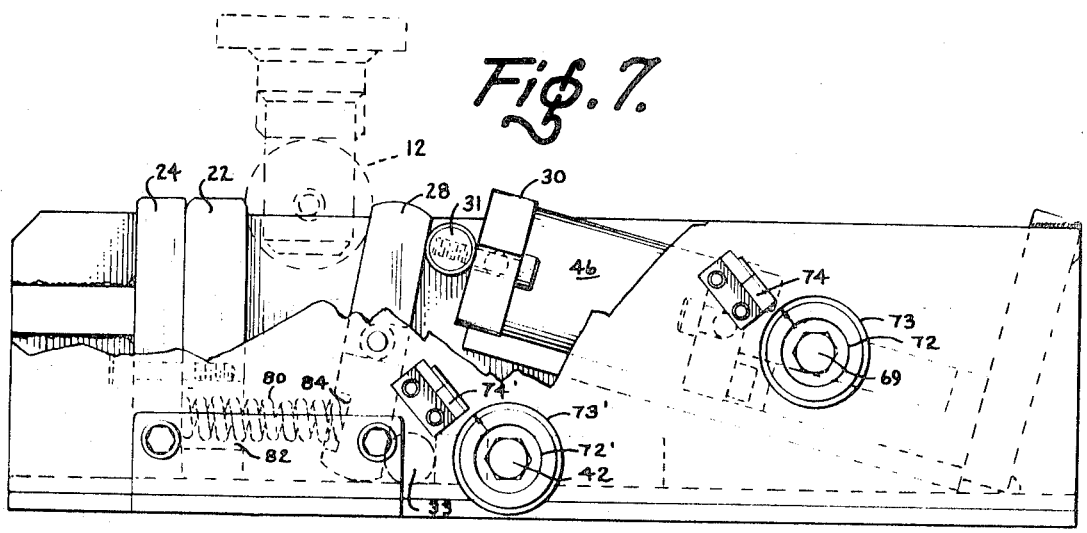
FIG. 7 is a cross-sectional view taken along the line 7—7 of FIG. 6.

A programmer in accordance with another embodiment of the invention is illustrated in FIGS. 6 and 7. As shown, programmer 10 is generally similar to the embodiments already described and comprises a tapered force resisting channel means 18 and an energy absorbing-storing means 20 arranged in a suitable frame means 26.

Whereas in the embodiment illustrated in FIGS. 1 through 4 the position of energy absorbing-storing means 20 was adjusted by means of adjusting screws 44, such adjustment is provided in the arrangement of FIGS. 6 and 7 by means of the cross-slide mechanism 60. Cross-slide mechanism 60 is similar to that of mehanism 36 and if desired may employ the same parts. To avoid confusion, however, the various elements of cross-slide 60 will be identified by different reference numerals.

To this end, cross-slide mechanism 60 is shown as comprising a stationary angle plate 62 and a mating angle plate 64 arranged for transverse movement within frame means 26 and along the angle plate 62. The other edge 65 of movable angle plate 64 fits in a slot 66 proved in end plate 29. If it is desired to employ the same angle plates as are used in cross-slide 36, members 67 and 68 may be provided upon which angle plates 62 and 64 rest to provide for the desired vertical position of such plates. Angle plate 64 is arranged to be moved transversely in frame 26 by means of a suitable adjusting screw 69.

Cross-slide mechanism 60 is shown provided with means for giving a visual indication of the position of movable angle plate 64 in frame 26. To this end, adjusting screw 69 is provided with an enlarged head portion 72 having a cylindrical rim 73. A linear scale means 74 is also provided which extends from the side wall of frame 26 and is positioned adjacent adjusting screw 69 so that the head portion 72 of adjusting screw 69 moves with respect to the linear scale means 74. Thus, as adjusting screw 69 is moved to move angle plate 64 to thereby change the position of the energy absorbing-storing means 20 (and the incline of inclined wall means 28). The rim 73 of the head of adjusting screw 69 will indicate such change in position on the linear scale means 74 thereby providing the desired visual indication.

In FIGS. 6 and 7 a similar visual indicating means is shown provided for the cross-slide mechanism 36 which provides for adjustment of the fulcrum means 33. As shown the adjusting screw 42 of cross-slide mechanism 36 is provided with a similar enlarged head portion 72' having a rim 73' which moves relative to the linear scale means 74'. Although not required, a suitable spring means may be provided to urge the movable angle plate (38 or 64) toward the end of the respective adjusting screw 42 or 69 in the cross-slide mechanisms 36 or 60 respectively.

The embodiment of FIGS. 6 and 7 also employs a different retainer means for the bottom of inclined wall means for the bottom of inclined wall means 28. As shown, there is provided a pair of spring means 80, one disposed near each end of the inclined wall means 28. One end of each of spring means 80 passes through an opening 82 in vertical wall 22 and rests against end wall 24. The other end of each of such spring means is retained in a suitable recess provided in the inclined wall means 28.

Adjustment of the channel means 18 is operative, in one mode, to change the initial vertical position of contact of the striker member 12 in the channel with respect to the fulcrum 33. Accordingly, the reaction force can be adjusted, as required, by selection of the initial vertical position of contact of the striker member 12 in the channel, selection of the angle of incline of wall means 28 and by adjustment and/or selection of the characteristics exhibited by the energy absorbing-storing means 20. Also, the coefficient of friction of the materials of the striker member and the walls of channel means 18 can be made selectively variable to further influence the operating characteristic of the shock programmer of this invention.

The foregoing description of the various features of this invention point out the ease and range of adjustments possible and the control obtainable from the programming means of this invention. The wall means of channel 18 are easily replaced in the event they become excessively worn or when materials exhibiting a different coefficient of friction are desired. Also, as indicated previously, the use of a rotatably supported cylindrical means as the striker member 12 provides for distributing wear around the surface of the striker member.

While only preferred features of the invention have been described in detail and shown by way of illustration, many changes and modifications will occur to those skilled in the art. It is, therefore, to be understood that the appended claims are intended to cover all such changes and modifications as fall within the true spirit and scope of the invention.

What I claim and desire to secure by Letters Patent of the United States is:

1. A shock pulse programmer for use with shock testing apparatus of the type wherein a movable carriage is arranged for guided movement toward a reaction mass, the combination comprising:

(a) A force resisting channel means interposed between a striker member and said reaction mass and arranged and adapted to be engaged by said striker member when said carriage descends to apply a decelerating force to said carriage, said channel means including first and second wall means one of which is an inclined wall means adapted to pivot about axes which are generally perpendicular to the direction of travel of said carriage;

(b) Fulcrum means contacting one end of said inclined wall means and about which said inclined wall means pivots;

(c) Retainer means urging said one end of said inclined wall means against said fulcrum; and (d) Energy absorbing-storing means operatively associated with said channel means to resist said pivotation of said inclined wall means so that the energy of said impacting striker member is distributed simultaneously to both said channel means and said energy absorbing-storing means to produce a selected non-linear force-displacement characteristic from said programmer to obtain a desired shock pulse.

2. The shock pulse programmer recited in claim 1 wherein said energy absorbing-storing means is an elastic means.

3. The shock pulse programmer recited in claim 2 wherein said elastic means is an elastomeric spring means.

4. The shock pulse programmer recited in claim 3 including means for pre-compressing the elastomeric spring means to cause said spring means to exhibit a desired operating characteristic.

5. The shock programmer recited in claim 1 wherein the other wall means of said channel means is a rigid wall means lying in a plane substantially parallel to the direction of travel of said carriage.

6. The shock programmer recited in claim 1 including means for adjusting the angle of said inclined wall means to vary the shape of said channel means.

7. The shock programmer recited in claim 6 wherein said means for adjusting the angle of said inclined wall means includes a first means for varying the position of the said one end of said inclined wall means in the plane perpendicular to the direction of travel of said carriage and a second means for varying the position of the other end of said inclined wall means in the plane perpendicular to the direction of travel of said carriage.

8. The shock programmer recited in claim 6 wherein said means for adjusting the angle of said inclined wall means includes a tapered cross slide mechanism operative to vary the position of said fulcrum means in the plane perpendicular to the direction of travel of said carriage.

9. The shock programmer recited in claim 7 wherein said first and second means each comprise tapered cross slide mechanisms.

10. The shock programmer recited in claim 8 including an actuating means connected with the movable member of said cross slide mechanism and a linear scale means separate from and adjacent said actuating means operative to provide a visual indication of the movement of said movable member.

11. A shock pulse programmer for use with shock testing apparatus of the type including a carriage arranged for guided movement with respect to a reaction mass, the combination comprising:
(a) A frame means interposed between said reaction mass and said carriage;
(b) Means disposed in said frame means defining a tapered force resisting channel, said means including a first rigid wall means lying in a plane substantially parallel to the direction of travel of said carriage and a second inclined wall means adapted to pivot about axes which are generally perpendicular to said direction of travel;
(c) Fulcrum means contacting one end of the said inclined wall means and about which said inclined wall means pivots and being adjustable longitudinally in said frame means to change the position of said one end of said inclined wall means within said frame means;
(d) Energy absorbing-storing means disposed in force responsive relationship at the other end of said inclined wall means operative to resist said pivotation of said inclined wall means and being adjustable to vary the position of said other end of said inclined wall means within said frame means; and
(e) Means for changing the energy absorbing-storing characteristic exhibited by said energy absorbing-storing means.

12. A shock programmer comprising:
(a) Channel means adapted to contact and apply a deceleration force to a striker member operatively associated with an impact test carriage, said channel means including a first rigid wall means and a second inclined wall means adapted to pivot about axes which are generally perpendicular to the direction of travel of said carriage;
(b) Fulcrum means contacting one end of said inclined wall means and about which said inclined wall means pivots;
(c) Retainer means urging said one end of said inclined wall means against said fulcrum; and
(d) Energy absorbing-storing means operative to resist said pivotation of said inclined wall means.

13. The shock programmer recited in claim 12 wherein said first rigid wall means lies in a plane substantially parallel to the direction of travel of said carriage.

14. The shock programmer recited in claim 12 wherein said energy absorbing-storing means comprises an elastomeric spring means.

15. The shock programmer recited in claim 12 including adjustable means for varying the angle of said inclined wall means to change the shape of said channel means.

16. The shock programmer recited in claim 15 wherein said adjustable means for varying the angle of said inclined wall means includes indicator means to provide a visual indication of movement of said adjustable means.

References Cited
UNITED STATES PATENTS

| 3,100,982 | 7/1963 | Cutler | 73—12 |
| 3,103,116 | 9/1963 | Kohli | 73—12 |
| 3,106,834 | 10/1963 | Parstorfer | 73—12 |
| 3,362,504 | 1/1968 | Maldarelli | 188—1 |

RICHARD C. QUEISSER, Primary Examiner

JOHN WHALEN, Assistant Examiner

U.S. Cl. X.R.

188—1